US011593921B1

(12) United States Patent
Monaghan (10) Patent No.: US 11,593,921 B1
(45) Date of Patent: Feb. 28, 2023

(54) SYSTEMS AND METHODS FOR SUPPLEMENTING IMAGE CAPTURE WITH ARTIFICIAL DATA POINTS THAT ARE GENERATED BASED ON MATERIAL PROPERTIES AND ASSOCIATED RULES (71) Applicant: Illuscio, Inc., Culver City, CA (US)

(72) Inventor: Robert Monaghan, Ventura, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 17/700,872

(22) Filed: Mar. 22, 2022

(51) Int. Cl.
*G06T 5/00* (2006.01)
(52) U.S. Cl.
CPC .... *G06T 5/005* (2013.01); *G06T 2207/10028* (2013.01)
(58) Field of Classification Search
CPC ...... G06K 9/6288; G06K 9/6262; G06K 9/62; G06V 10/82; G06V 10/70; G06T 2207/30168; G06T 17/00; G06T 7/246; G06T 7/70; G06T 7/74; G06T 19/006; G06T 2200/08; G06T 2207/10028; G06T 7/248; G06T 7/344; G06T 2210/61; G06T 7/11; G06T 7/50; G06T 13/40; G06T 13/20; G06T 15/00; G06T 15/04; G06T 15/205; G06T 7/00; G06T 13/00; G06T 13/60
See application file for complete search history.

(56) References Cited

U.S. PATENT DOCUMENTS

| | | | | |
|---|---|---|---|---|
| 2013/0286004 A1* | 10/2013 | McCulloch | ........... | G06T 19/006 345/419 |
| 2017/0287216 A1* | 10/2017 | Kim | ........................ | G06T 17/00 |
| 2018/0276793 A1* | 9/2018 | Kwon | ...................... | G06T 7/579 |
| 2020/0020132 A1* | 1/2020 | Sinharoy | ............. | H03M 7/3059 |
| 2020/0158875 A1* | 5/2020 | Feng | ...................... | G01S 7/4808 |
| 2022/0027654 A1* | 1/2022 | Iwami | ................... | G06K 9/6217 |

* cited by examiner

*Primary Examiner* — Xiao M Wu
*Assistant Examiner* — Scott E Sonners
(74) *Attorney, Agent, or Firm* — Ansari Katiraei LLP; Arman Katiraei; Sadiq Ansari (57) ABSTRACT

Disclosed is a system to add photorealistic detail and motion to an image based on a first material property associated with a first set of data points of an incomplete first object, and a second material property associated with a second set of data points of an incomplete second object in the image. The system may generate first artificial data points amongst the first set of data points that completes a first arrangement defined for the first material property, and may generate second artificial data points amongst the second set of data points that completes a second arrangement defined for the second material property. The system may then output an enhanced image of the completed first object based on first set of data points and the first artificial data points, and of the completed second object based on the second set of data points and the second artificial data points.

18 Claims, 9 Drawing Sheets

SYSTEMS AND METHODS FOR SUPPLEMENTING IMAGE CAPTURE WITH ARTIFICIAL DATA POINTS THAT ARE GENERATED BASED ON MATERIAL PROPERTIES AND ASSOCIATED RULES

BACKGROUND

A point cloud may represent a three-dimensional ("3D") object or environment with millions or billions of data points. Each data point may capture the positioning and coloring of a different surface, feature, or article from the 3D object or environment at a corresponding point in space.

Despite the volume of data (e.g., number of data points) contained in the point cloud, there may be certain regions or parts within the point cloud that have gaps or missing data points. For instance, a scanner may be unable to scan the corresponding regions or parts of the 3D object or environment due to the positioning of the scanner (e.g., too far away) and/or obstacles that prevent a clear and unobstructed scan of the corresponding regions or parts.

Current image processing techniques for artificially filling in gaps do not produce photorealistic results as they rely almost exclusively on the surrounding color information to fill in the gaps. These techniques simply ignore the many other properties that contribute to the visual characteristics and makeup of the 3D object or environment when filling in the gaps with artificially created data points.

DETAILED DESCRIPTION OF PREFERRED EMBODIMENTS

The following detailed description refers to the accompanying drawings. The same reference numbers in different drawings may identify the same or similar elements.

Provided are systems and methods for supplementing image capture with artificial data points that are generated based on material properties of imaged surfaces, objects, and/or articles, and rules that define different visual and non-visual relationships and interactions between the material properties. In some embodiments, the artificially generated data points may fill in gaps or enhance parts of the image with photorealistic coloring, lighting, textures, detail, etc. To achieve this enhanced realism, the systems and methods may generate the artificial data points by matching not only the coloring data of neighboring data points, but other material properties of the neighboring data points that collectively contribute to the photorealistic visual characteristics and makeup of the rendered image. In some embodiments, the systems and methods may generate rules for the different material properties that accurately model the real-world physics of different materials, the reactivity of different materials to different forces or effects, and/or the relationships and interactions between one or more materials. The systems and methods may apply the rules to different parts of the image that are defined with different material properties in order to generate realistic but different motion, effects, and/or animation for each material property in the image. The systems and methods may also generate entirely new photorealistic structures based on interdependent rules. For instance, the artificially generated data points for a structure of a first material property may be adapted according to the structure of another set of data points with a second material property based on one or more rules that link and/or adjust the structure of the first material property to the structure of the second material property.

The systems and methods may be used to supplement, animate, process, render, and/or otherwise edit point clouds and/or other two-dimensional ("2D") and three-dimensional ("3D") image formats. A point cloud may include a set of data points for representing a three-dimensional ("3D") or volumetric object or environment.

The point cloud data points may differ from pixels of a two-dimensional ("2D") image, because certain regions of the point cloud may have no data points, lower densities of data points, and/or higher densities of data points based on varying amounts of visual information that is detected at those regions. In contrast, pixels of a 2D image have a uniform density and fixed arrangement that is defined by the resolution of the 2D image. In other words, the point cloud data points may have a non-uniform placement or positioning, whereas the 2D image has pixel data for each pixel of a defined resolution (e.g., 640×480, 800×600, etc.).

Each point cloud data point may be defined with a plurality of elements. The plurality of elements may include a first set of positional elements, and a second set of non-positional or descriptive elements.

The positional elements may include coordinates within 3D space. For instance, each point cloud data point may include x-coordinate, y-coordinate, and z-coordinate elements to capture the position of an imaged surface, feature, or article of the 3D object in 3D space.

The non-positional elements may include information about the detected characteristics of the surface, feature, or article imaged at a corresponding position in 3D space. This may include visual and non-visual characteristics of the corresponding surface, feature, or article.

In some embodiments, the characteristics represented by the non-positional elements may correspond to a detected color. The color may be represented using red, green, blue ("RGB"), and/or other values. In some embodiments, the characteristics represented by the non-positional elements may provide the chrominance and/or luminance of the imaged surface, feature, or article.

In some embodiments, one or more of the non-positional elements of a data point may include identifiers for various material properties of the surface, feature, or article represented by that data point. For instance, the material property identifiers may indicate the material composition of the represented surface, feature, or article (e.g., wood, plastic, ceramic, metal, etc.). In some embodiments, the material property identifiers may specify the magnetism, strength, rigidity (e.g., softness or hardness), viscosity, stickiness, weight, reflectivity, gravitational affects, and/or other characteristics associated with the material of the represented surface, feature, or article.

In some embodiments, a rule definition may associate rules to each of the material property identifiers. The rules may specify relationships and/or interactions between data points that are defined with the same or different material properties. The relationships may include a specific structure with which data points defined with a particular material property or identifier are arranged or organized (e.g., honeycomb lattice, cubic lattice, hexagonal lattice, etc.) similar to bonds that exist between different molecules, compounds, or elements. The interactions may include the degree with which a change made to one data point defined with a particular material property affects neighboring data points defined with the same material property. The rules may specify the impact that an applied change or adjustment has to the positional and non-positional or descriptive elements of a data point defined with a particular material property.

For instance, a first rule may define the reflectivity or light reactivity of different material properties (e.g., "shiny", "matte", "chrome", "metallic", "wood", etc.), and may control how a data point defined with the different identified material properties reacts to light (e.g., how to render that data point in response to different amounts of light). A second rule may define the stickiness of different material properties (e.g., "slick", "slippery", "rough", "abrasive", "jagged", etc.), and may control how much color is absorbed by a data point defined with the different identified material properties when a paintbrush tool or other editing tool is used to modify the data point color. A third rule may define the rigidity of different material properties (e.g., "strong", "weak", "plastic", "metal", "ceramic", "thin", "thick", etc.), and may specify different amounts of displacement for the positional elements of a data point defined with the different identified material properties in response to an applied force or impact. A fourth rule may define the polarity and interaction between data points defined with different magnetic material properties.

In some embodiments, the rules may be expressed as or may include percentages, numerical values, mathematical formulas, equations, regular expressions, and/or executable code to specify a change and/or other impact that a rule has on one or more positional elements and/or non-positional elements of a single data point, or to specify the relationships and interactions between data points that are defined with the same one or more material properties or with specific combinations of material properties. In some embodiments, the rules may be expressed as or may include formulas, equations, regular expressions, and/or executable code to represent an organization, arrangement, and/or other structuring of data points that are defined with the same one or more material properties or with specific combinations of material properties.

Figure 1:
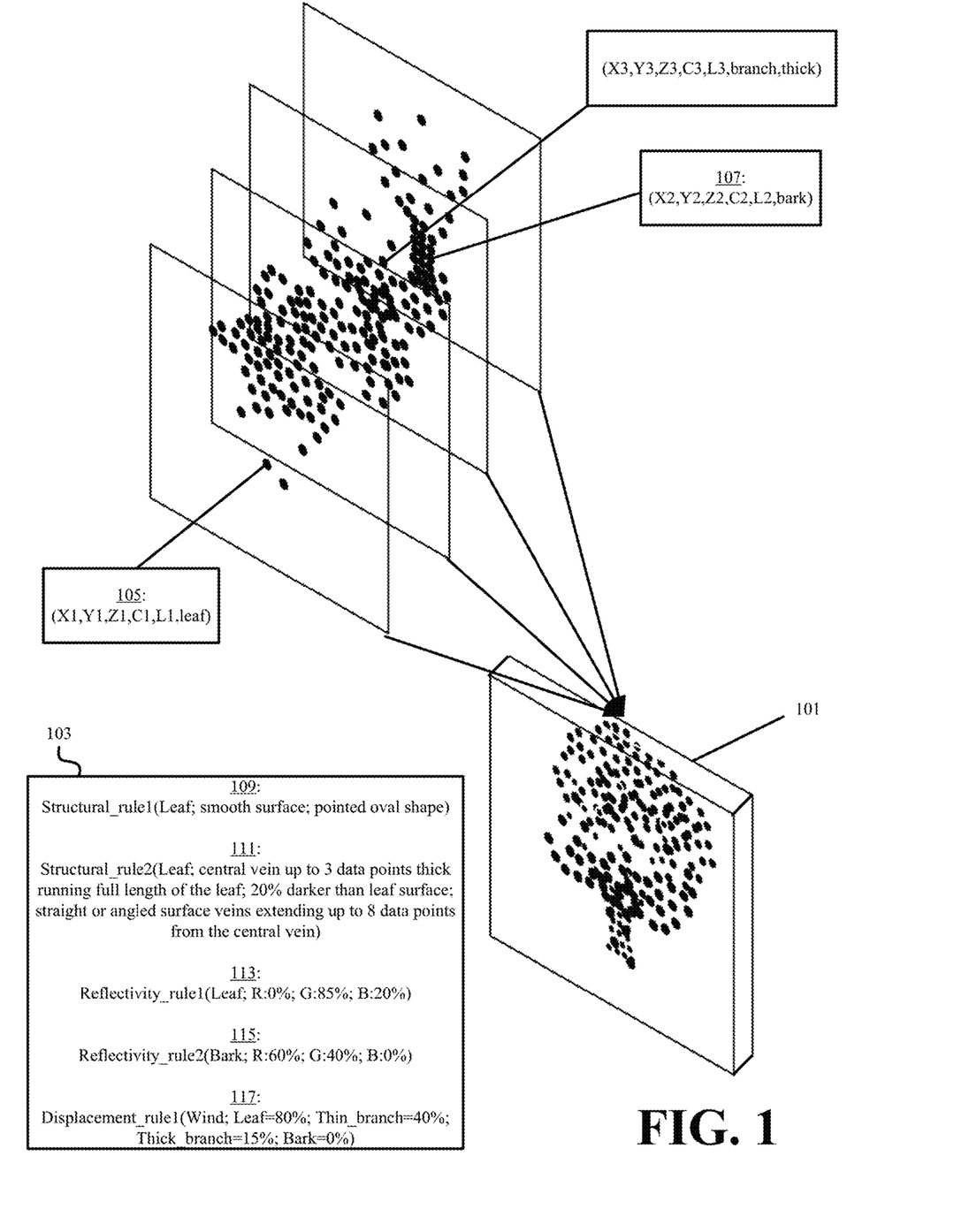
FIG. 1 illustrates an example point cloud defined with material properties, and a rule definition specifying different rules to apply to each material property in accordance with some embodiments presented herein.

FIG. 1 illustrates an example point cloud 101 defined with material properties, and rule definition 103 specifying different rules to apply to each material property in accordance with some embodiments presented herein. Each data point of point cloud 101 may be defined as an array of elements. The array of elements may provide the positioning of the data point in 3D space as well as one or more visual characteristics, non-visual characteristics, and/or material properties of that data point. For instance, data point 105 may be defined with a first set of x-coordinate, y-coordinate, z-coordinate, red, green, blue, chrominance, and luminance values, and with one or more material properties (e.g., "leaf") for the surface, feature, object, or article represented by data point 105. Data point 107 may be defined with a second set of x-coordinate, y-coordinate, z-coordinate, red, green, blue, chrominance, and luminance values, and with one or more different material properties (e.g., "bark") for the surface, feature, object, or article represented by data point 107.

Rule definition 103 may include rules that specify bonds, relationships, and/or interactions between data points defined with the same material property and/or combinations of different material properties. For instance, rule definition 103 may include first rule 109 that defines a smooth and pointed oval shape for neighboring data points with the "leaf" material property, and second rule 111 that defines a distribution of veins from the center line of neighboring data points with the "leaf" material property. Rule definition 103 may also include rules for adjusting, editing, processing, and/or rendering data points defined with different material properties. For instance, rule definition 103 may include third rule 113 that specifies a first amount of reflectivity for data points with the "leaf" material property, and fourth rule 115 that specifies a lower second amount of reflectivity for data points with the "bark" material property. Rule definition 103 may also include fifth rule 117 for defining a first displacement of data points with the "leaf" material property, a second displacement of data points with a "thin branch" material property, a third displacement of data points with a "thick branch" material property, and a fourth displacement of data points with the "bark" material property in relation to an amount of applied force (e.g., wind). Rules 109, 111, 113, 115, and 117 may identify a category (e.g., define a structure, affected elements, relationship, etc.) and parameters for one or more material properties associated with the rule, percentages or values for an amount of impact to the identified elements, and/or regular expressions, formulas, code, and/or function calls for specifying other changes, impacts, and/or processing of the affected data points.

Point cloud 101 and the individual data points of point cloud 101 may be generated by a 3D or depth-sensing camera, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, and/or other imaging equipment for 3D objects, volumetric objects, or 3D environments. Point cloud 101 may be generated from output of two or more devices. For instance, a first imaging device (e.g., a LiDAR sensor) may determine the position for each data point in 3D space, and a second imaging device (e.g., a high-resolution camera)

may measure or capture the characteristics, material properties, or other non-positional information for each data point.

In some embodiments, the material properties defined for the data points of point cloud 101 and the associated rules in rule definition 103 may be manually provided or may be automatically determined via artificial intelligence and/or machine learning techniques ("AI/ML"). For instance, an AI/ML classifier may receive images or videos of different material properties (e.g., glass, wood, ceramic, plastic, metal, etc.) with labels that identify the material properties. The AI/ML classifier may analyze the images or videos, and may generate models for the positional and non-positional relationships for different material properties (e.g., tight circular cluster for a first material property, RGB values in a particular range for a second material property, etc.), for the reactivity of the materials or material properties to different forces, pressures, colors, light, movement, temperature, sound, and/or other changes, and/or for other relationships that may be used to differentiate data points of one material property from another or to differentiate reactivity of material properties to different forces, effects, and/or input. The AI/ML classifier may generate rules for the material properties based on the trained models, and the rules may include mathematical formulas, numerical values, percentages, and/or other expressions to specify the different reactivity that the different material properties have to the different changes.

In some embodiments, the material properties may be manually associated with different point cloud data points. For instance, a system may generate a visualization or image based on the positional and non-positional elements of the point cloud data points, and a user may use a selection tool to select different regions within the visualization or image and to assign a material property to the set of data points in the selected region.

In some embodiments, the material properties may be programmatically associated with different point cloud data points. In some such embodiments, rule definition 103 may include material properties that are defined relative to values of two or more data point elements. For instance, rule definition 103 may specify adding the "Gold" material property to data points that have red color values in a first range, green color values in a second range, and blue color values in a third range. Similarly, rule definition 103 may specify adding the "Wood" material property to data points that have chrominance values in a first range, red color values in a second range, and green color values in a third range.

In some embodiments, the material properties may be automatically assigned to the point cloud data points by a device that is used to create the point cloud data points. In some such embodiments, the device may identify the spectral properties of each detected surface, feature, or article that is represented by a point cloud data point, the spectral properties may map to different materials properties defined in rule definition 103, and the material properties may be assigned to the data points based on the mapping.

Some embodiments may provide a system for adjusting, editing, processing, and/or rendering point clouds and/or other 2D and 3D images based on the material properties associated with different data points in the point clouds or images, and the rules defined for the material properties in a rule definition. The system may be implemented using specialized hardware such as a Graphics Processing Unit ("GPU"), or by configuring one or more processors with software to perform the material property and/or rule based adjusting, editing, processing, and/or rendering.

In some embodiments, the system may use the material properties and/or associated rules to generate artificial data points in empty regions or parts of a point cloud. In some such embodiments, the system may enhance or add photorealistic detail (e.g., visual surfaces, features, articles, and/or objects) to the empty regions or parts by generating the artificial data points based on the coloring data and the material properties of the neighboring data points that collectively contribute to the photorealistic visual characteristics and makeup of the neighboring data points.

Accordingly, the artificially generated data points are not mere duplicates of the neighboring data points with or without some randomization. Instead, the artificially generated data points may incorporate specific and photorealistic variation based on the material properties and the associated rules. For instance, the system may generate the artificial data points to have or follow the patterns, textures, lighting, and/or other representations of the material properties of the neighboring data points. Consequently, the visual characteristics and makeup of the artificially generated data points rely on the color values and also the material properties of the neighboring data points to create a photorealistic extension of the one or more materials represented by the neighboring data points across the artificially generated data points.

Figure 2:
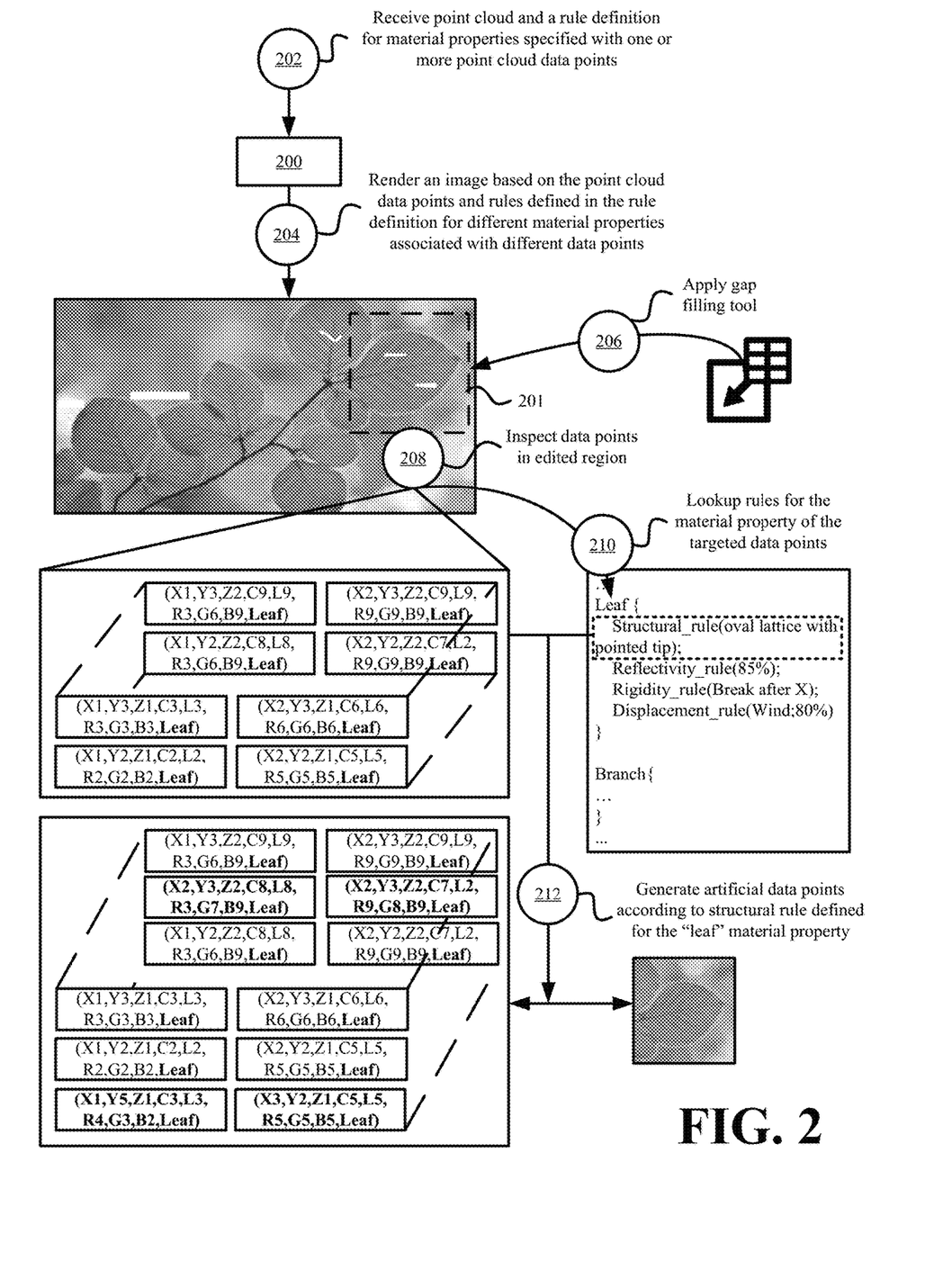
FIG. 2 illustrates an example of generating artificial data points based on the material properties and associated rules of neighboring data points in accordance with some embodiments presented herein.

FIG. 2 illustrates an example of generating artificial data points based on the material properties and associated rules of neighboring data points in accordance with some embodiments presented herein. As shown in FIG. 2, system 200 may receive (at 202) a point cloud and a rule definition with rules for material properties defined as part of some of the data point non-positional elements. The point cloud may include an original set of data points, and each data point may be defined with values for positional and non-positional elements. The values for one or more of the non-positional elements may include labels or identifiers for different material properties.

System 200 may render (at 204) part or all of the point cloud as an image on a display. Rendering (at 204) the point cloud may include generating a visualization for each data point of the original set of data points at a defined position in 3D space based on values contained in the positional and non-positional elements of that data point, and/or adjusting the values for one or more of the positional and non-positional elements of a subset of data points based on rules from the rule definition that are associated with material properties defined in one or more non-positional elements of the subset of data points.

System 200 may provide one or more tools for editing the point cloud and/or rendered image. In some embodiments, the tools may include interactive graphical user interface ("GUI") elements that may be applied to different parts of the point cloud or rendered image via mouse clicks, touch gestures, and/or other inputs. In some embodiments, the tools may be defined as different function calls within an Application Programming Interface ("API").

As shown in FIG. 2, a user may select and apply (at 206) a gap filling tool to fill in a gap within region 201 of the rendered image that includes a particular set of data points. The gap may include a region of space within the point cloud that includes a sparse distribution of data points (e.g., the distance between neighboring data points is greater than a threshold amount), an empty region of space within the point cloud that is surrounded by dense clusters of data points, and/or deviations from an expected clustering, distribution, structure, and/or other grouping of data points in a region.

System 200 may detect that the gap filling tool is activated over region 201. System 200 may select (at 208) the particular set of data points within region 201 and/or the particular set of data points to which the gap filling tool is applied, and may inspect the positional and non-positional elements of the particular set of data points.

System 200 may obtain any material properties that are specified for any data point of the particular set of data points, and may lookup (at 210) any rules that are associated with the obtained material properties in the rule definition. As shown in FIG. 2, the particular set of data points are associated with a "leaf" material property, and the rule definition may contain a structural rule that specifies a specific lattice or arrangement for data points with the "leaf" material property.

System 200 may use the structural rule to determine where and how many artificial data points to generate within region 201 in response to activation of the gap filling tool. For instance, system 200 may analyze the positional elements of the particular set of data points to determine conformity with the leaf lattice specified as a rule for the "leaf" material property in the rule definition, and may add (at 212) artificially generated data points based on the size of the gap detected in the leaf lattice. In other words, system 200 does not randomly add data points to region 201 or the particular set of data points. Instead, system 200 adds (at 212) data points based on the "leaf" material property of the neighboring data points in a manner that preserves or continues the visual characteristics and makeup of the "leaf" material property throughout region 201 as defined by the structural rule for the "leaf" material property. This may include adding (at 212) data points to continue a pattern, provide a specific texture, match a form, and/or introduce variation that is specific to that material property and that is defined as rule within the rule definition.

Adding (at 212) the artificially generated data points may include providing values for the non-positional elements of the artificially generated data points based on values for the same non-positional elements of the surrounding particular set of data points, the "leaf" material property, and/or any associated rules for the "leaf" material property that apply to the non-positional elements. For instance, system 200 may generate the RGB color values for an artificially generated data point based on the RGB color values of the closest data points within the particular set of data points, and may adjust the amount of light that reflects off that artificially generated data point based on a rule that is defined in the rule definition for the reflectivity of the "leaf" material property.

System 200 may render the point cloud with the artificially generated data points to present the visualization after the gap filling operation is complete. Specifically, system 200 may render the point cloud to present the added detail that is specific to the "leaf" material property and the rules for that material property in the rule definition.

Figure 3:
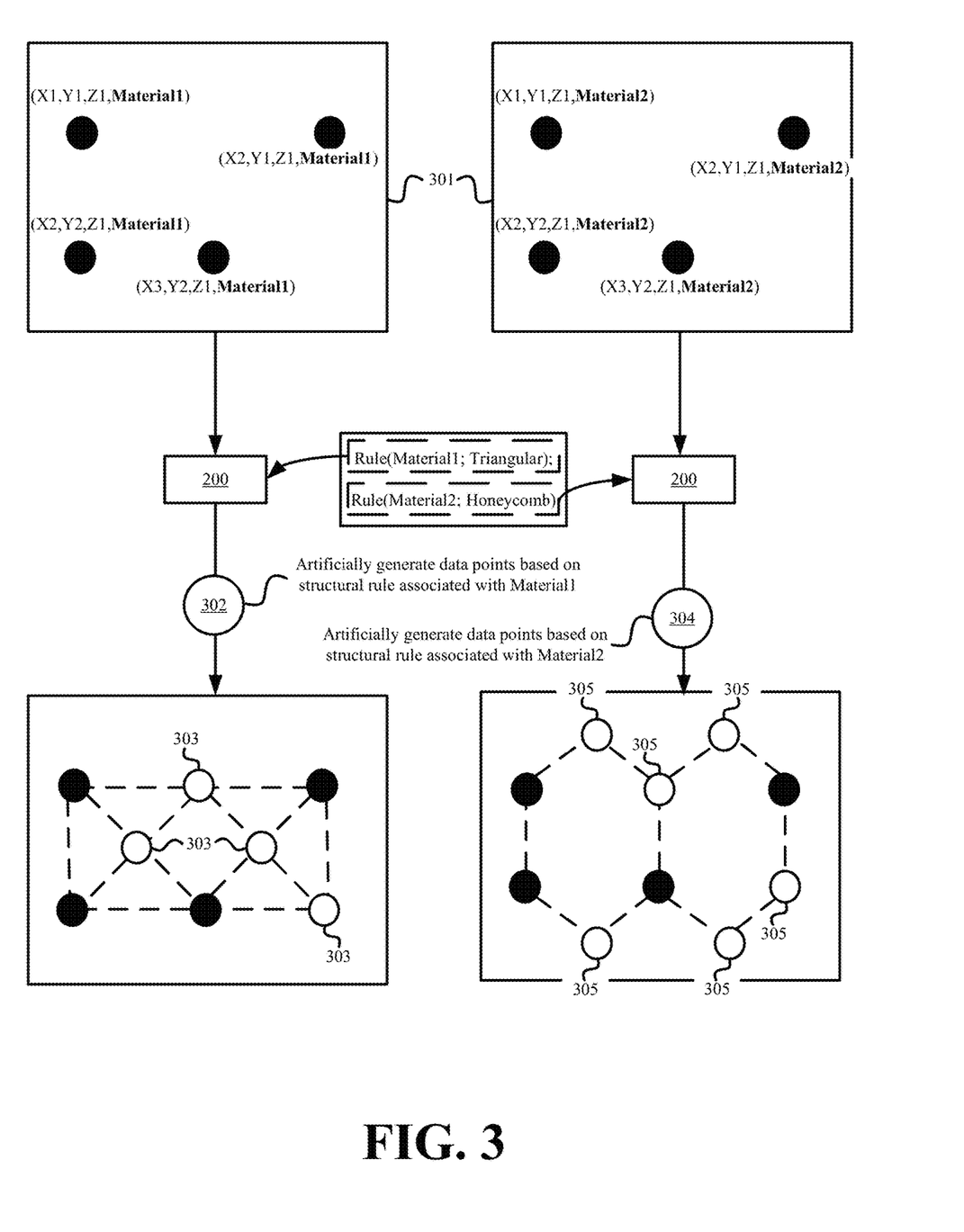
FIG. 3 illustrates an example of using the material properties and the associated rules to generate different sets of artificial data points in accordance with some embodiments presented herein.

FIG. 3 illustrates an example of using the material properties and the associated rules to generate different sets of artificial data points in accordance with some embodiments presented herein. Specifically, FIG. 3 illustrates performing different gap filling operations on the same set of data points 301 in response to data points 301 being defined with different material properties.

For instance, data points 301 may be defined with a first material property, and the first material property may be associated with a first rule that defines a triangular structure for the first material property. Accordingly, when performing the gap filling operation on data points 301 defined with the first material property, system 200 may artificially generate (at 302) data points 303 according to the triangular structure specified for the first rule for the first material property.

When data points 301 are defined with a second material property, system 200 may use a second rule, that is associated with the second material property, to generate (at 304) a different set of data points 305. As shown in FIG. 3, the second material property may be associated with the second rule that defines a honeycomb structures for the second material property. Accordingly, when performing the gap filling operation on data points 301 defined with the second material property, system 200 may artificially generate (at 304) data points 305 according to the different honeycomb structure specified for the second rule for the second material property. In some embodiments, data points 305 of the second material property may be generated with a different density or inter-point distance than data points 303 of the first material property based on other differences in the associated rules.

In some embodiments, system 200 may also define the non-positional elements of data points 303 different than the non-positional element of data points 305 based on additional rules specified in the rule definition for the visual and non-visual characteristics of the different material properties. For instance, system 200 may define data points 303 with different reflectivity, color absorption, opaqueness, strength, displacement, magnetism, and/or other characteristics than data points 305 based on the associated rules for the different material properties.

In some embodiments, system 200 may automatically generate the artificial data points to include in a point cloud in order to enhance the detail of the point cloud. For instance, the artificially generated data points may be used to accurately recreate an object with one or more broken or missing parts based on the material properties of that object. In this manner, system 200 may virtually restore an archeologic object or site to its original form.

Figure 4:
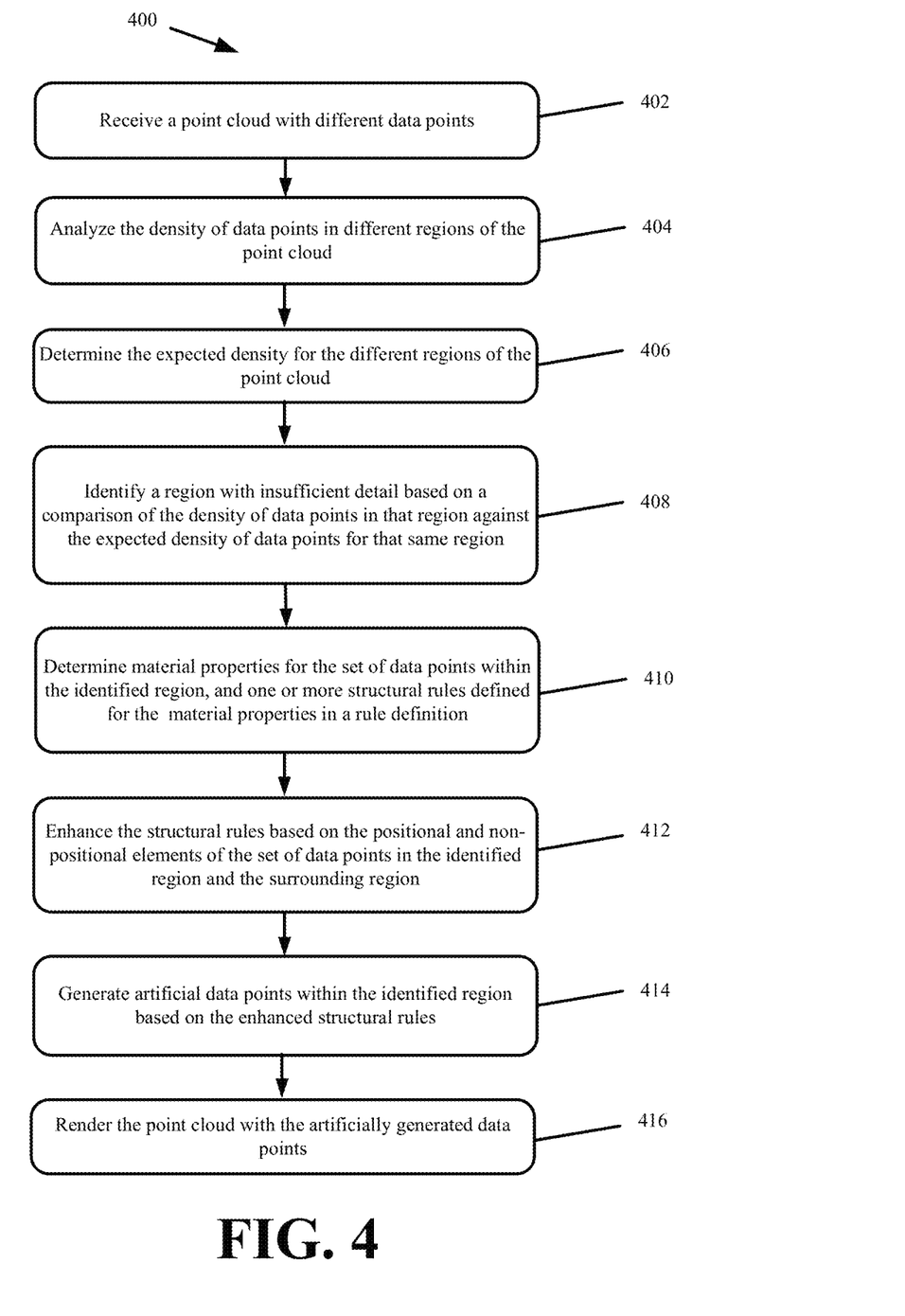
FIG. 4 presents a process for generating artificial data points based on the material properties and associated rules of neighboring data points in accordance with some embodiments presented herein.

FIG. 4 presents a process 400 for generating artificial data points based on the material properties and associated rules of neighboring data points in accordance with some embodiments presented herein. Process 400 may be implemented by system 200.

Process 400 may include receiving (at 402) a point cloud comprising a plurality of data points. In some embodiments, system 200 may receive (at 402) a file that contains each of the point cloud data points.

Process 400 may include analyzing (at 404) the density of data points in different regions of the point cloud. The density may be determined based on the number of data points defined in a given volume or region of the point cloud, and/or based on the relative positions of the data points in that volume or region.

Process 400 may include determining (at 406) the expected density for the different regions of the point cloud. Determining (at 406) the expected density may include identifying a material property that is defined for one or more data points in a region, and obtaining any rules from the rule definition that may specify the structure for the data points with the identified material property. Determining (at 406) the expected density may also include computing the expected density based on the density of data points in surrounding or neighboring regions.

Process 400 may include identifying (at 408) a region that contains insufficient detail based on a comparison of the density of data points in that region against the expected density of data points for that same region. In some embodiments, system 200 may identify a gap in the point cloud or a region that was inaccurately captured when the actual density of data points is less than the expected density by a threshold amount (e.g., actual density is more than 20% less than the expected density). The threshold may differ based on the material property associated with the data points in a given region.

Process 400 may include determining (at 410) one or more material properties for the set of data points within the identified region, and one or more structural rules defined for the one or more material properties in a rule definition. The structural rules for a particular material property may define an arrangement, positioning, distribution, and/or other structure for the data points of that particular material property.

Process 400 may include enhancing (at 412) the structural rules based on the positional and non-positional elements of the set of data points in the identified region and the surrounding region. For instance, the structural rule associated with a material property may specify a pattern that is dependent on the relative positioning of two or more neighboring data points in the set of data points. The structural rule may also specify variations in the coloring and/or other non-positional elements of the data points with that material property. In some embodiments, the set of data points within the identified region may not be defined with a material property or the defined material property may not be associated with any structural rules in the rule definition. In some such embodiments, system 200 may rely on the positional and non-positional elements of the existing set of data points and/or other neighboring data to define structural rules for populating the region with artificial data points.

Process 400 may include generating (at 414) artificial data points within the identified region based on the enhanced structural rules. The enhanced structural rules may specify a location for each new artificial data point that adheres to the structural arrangement of data points defined for a particular material property as a structural rule, and/or that continues the structural arrangement of existing data points. In other words, system 200 does not randomly or uniformly generate artificial data points in different regions of the point cloud. Instead, system 200 inserts artificial data points in a manner that matches the structure of the material property defined for the neighboring data points. Similarly, system 200 does not simply copy the coloring values and/or other non-positional elements from a neighboring data point and apply them to an artificially generated data point. Instead, system 200 may use rules from the rule definition to base the non-positional elements of the artificially generated data points on the values from the non-positional elements of neighboring data points as adjusted by rules associated with the material property of those data points.

Process 400 may include rendering (at 416) the point cloud with the artificially generated data points. Rendering (at 416) the point cloud may include presenting an enhanced visualization for the identified region that is more detailed than the original presentation created without the artificially generated data points. The additional detail comes from the higher resolution or greater number of data points used to visually represent the material properties in the identified region.

In some embodiments, system 200 may store the point cloud with the artificially generated data points in a file. In some embodiments, system 200 may add a tag or non-positional element to differentiate the artificially generated data points from the data points of the unedited point cloud. Based on the tags, system 200 may undo or redo the different edits by presenting or hiding the artificially generated data points from the rendered image. Moreover, the tags may be associated with the material properties so that the edits may be selectively applied or removed with respect to data points with specific material properties.

Figure 5:
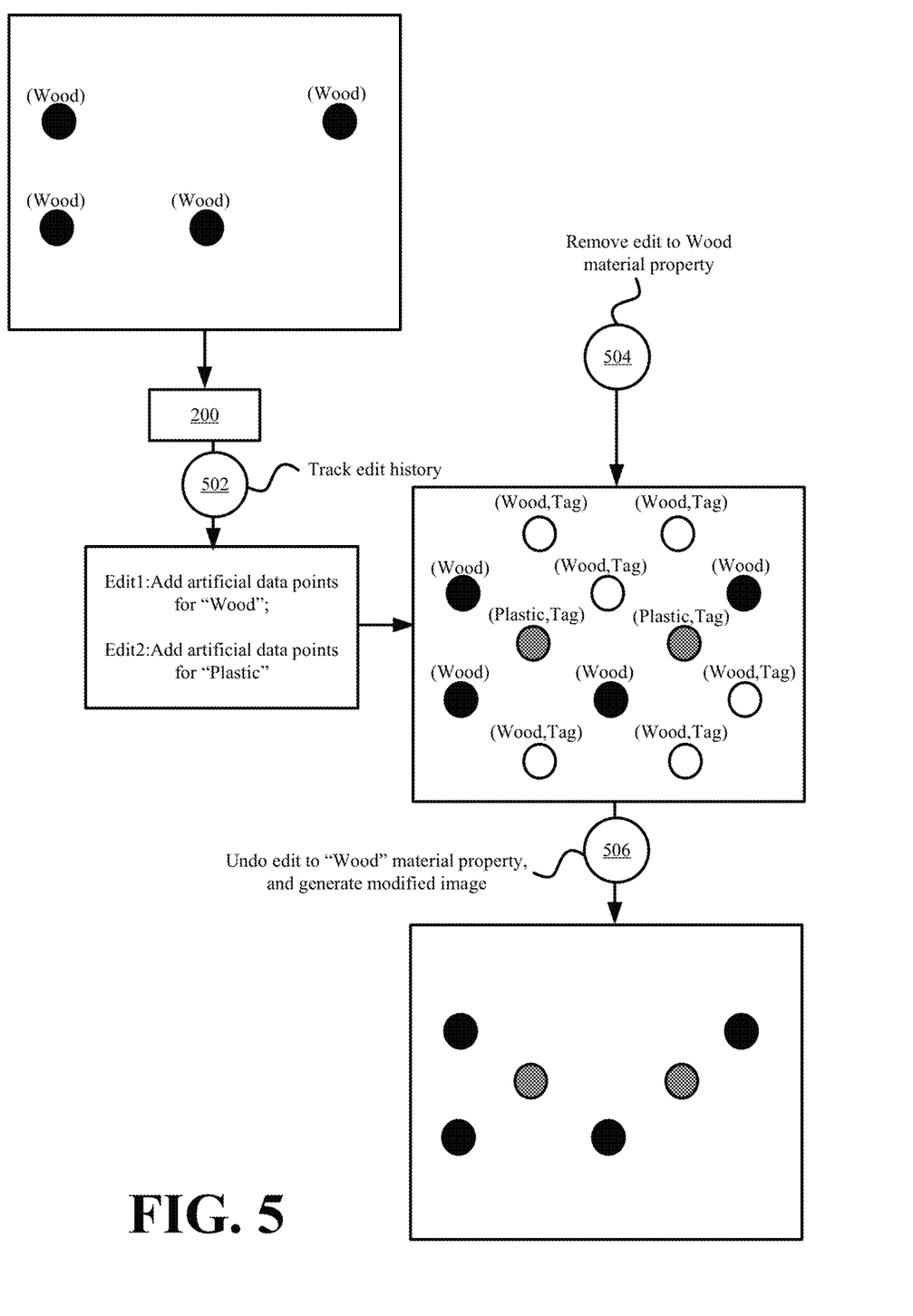
FIG. 5 illustrates an example for selectively applying edits based on material properties of data points in accordance with some embodiments presented herein.

FIG. 5 illustrates an example for selectively applying edits based on material properties of data points in accordance with some embodiments presented herein. As shown in FIG. 5, system 200 may receive (at 502) an image with a first set of data points that are defined with a first material property. Edits may be applied to modify the image. Specifically, a first edit may result in the generation of a second set of data points that include a tag and that are defined with the first material property, and second edit may result in the generation of a third set of data points that include a tag and that are defined with a second material property. The first set of data points are illustrated as solid black points in FIG. 5, the second set of data points are illustrated as unshaded or white points in FIG. 5, and the third set of data points are illustrated as partially shaded or gray points in FIG. 5.

System 200 may store or track the edit history in order to allow for the edits to be undone in reverse of the order that they were added to the point cloud. Additionally, system 200 may selectively target different edits based on the material property. For instance, system 200 may receive (at 504) input to remove the edit applied to the first material property. System 200 may bypass the edit history, and may directly identify the second set of data points for removal based on the second set of data points being defined with the first material property and being tagged to indicate data points modified as a result of an applied edit involving the first material property. System 200 may remove or hide the second set of data points to undo the edit to the first material property, and may render or generate (at 506) an image based on the first set of data points and the third set of data points.

In some embodiments, the rules may be applied to existing data points in addition to or instead of artificially generated data points. For instance, the rules may alter the positional elements of a first subset of data points that are defined with a first material property, and that do not conform to a structural rule associated with the first material property. Similarly, the rules may alter the non-positional elements of a second subset of data points that are defined with a second material property, and that do not conform to a coloring rule associated with the second material property.

Figure 6:
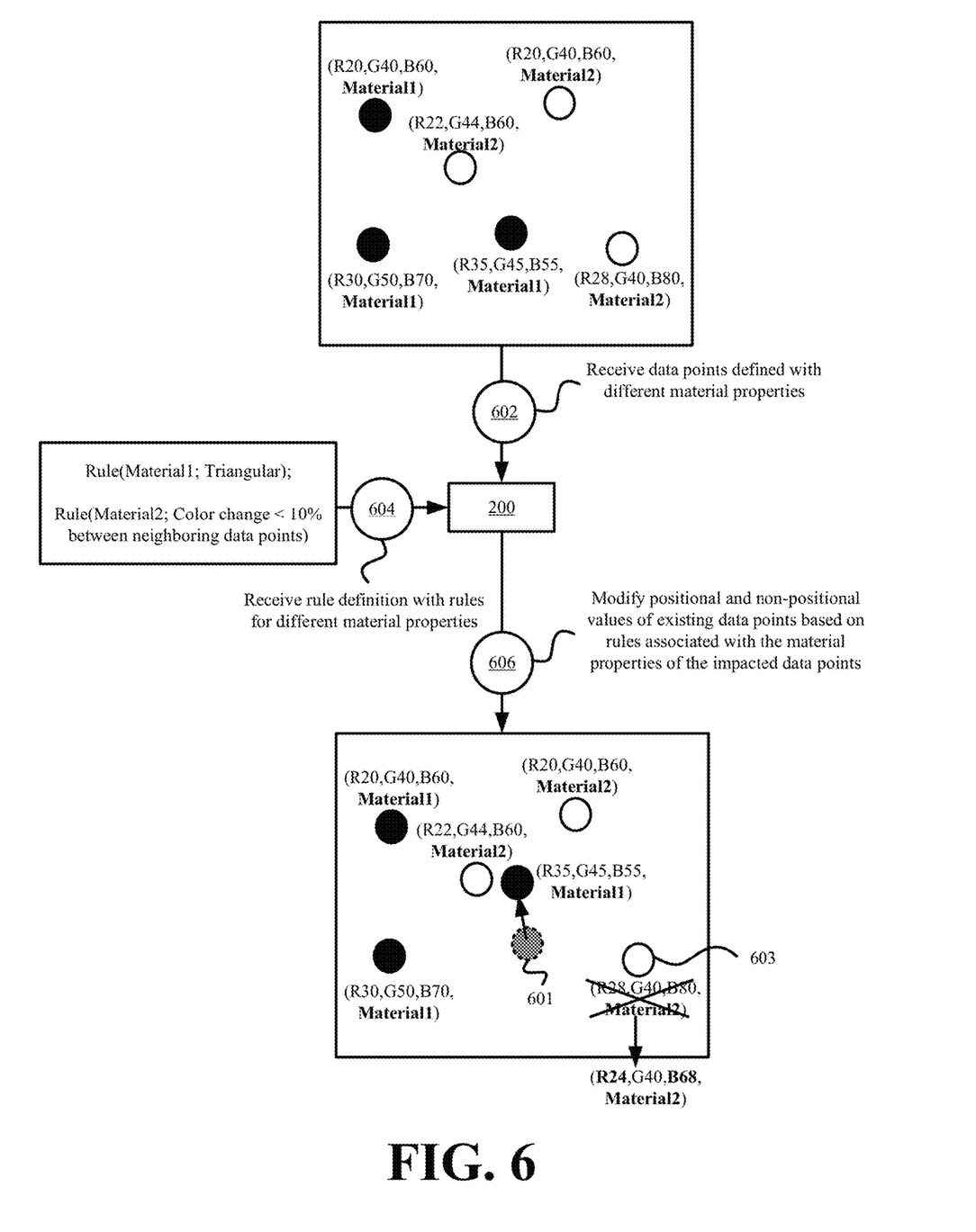
FIG. 6 illustrates an example of using the material property and associated rules to adjust positional and non-positional elements of existing data points in accordance with some embodiments presented herein.

FIG. 6 illustrates an example of using the material property and associated rules to adjust positional and non-positional elements of existing data points in accordance with some embodiments presented herein. As shown in FIG. 6, system 200 may receive (at 602) a point cloud that includes a first set of data points defined with a first material property and a second set of data points defined with a second material property. System 200 may also receive (at 604) rule definition that includes different rules for the first material property and for the second material property.

System 200 may modify (at 606) the point cloud by applying the rules to the existing data points. Specifically, system 200 may determine that the positioning of the first set of data points does not match a structural rule that is specified for the first material property. Accordingly, system 200 may modify the positional elements of one or more of the first set of data points 601 to rearrange or reposition the first set of data points according to the structural rule. The structural rule may be associated with the first material property, and is therefore not applied to or enforced on the second set of data points defined with the second material property. Similarly, system 200 may determine that the color values of the second set of data points does not satisfy a coloring rule that is specified for the second material property, and may modify the corresponding non-positional elements of one or more of the second set of data points 603 to adjust the color values in accordance with the coloring rule. The coloring rule may be associated with the second material property, and is therefore not applied to or enforced on the first set of data points defined with the first material property.

In this manner, system 200 may perform dynamic and different auto-corrections to the positional and non-positional elements of the point cloud data points based on the material properties associated with the data points and different rules that are associated with each of the material properties. The auto-corrections may be performed in conjunction with or separate from the generation of the artificial data points for the different material properties. In other words, system 200 may also use the material properties and associated rules to dynamically generate artificial data points in different numbers, clusters, arrangements, and/or other variations in positional and non-positional elements. The auto-corrections and artificially generated data points based on the material properties and associated rules enhance the photorealism of a point cloud and/or any edits made to the point cloud by recreating exact and/or complex forms, shapes, textures, and/or other properties of different materials without a user having to manually define each of the data points in the correct location and/or with the correct characteristics.

In some embodiments, the rules for the same material property may include conditions that restrict the application of the different rules to existing subsets of data points that satisfy those conditions. The conditions may be defined relative to one or more positional or non-positional elements of a subset of a data points. For instance, a rule definition may include a set of rules for recreating complex variations in the grain of a particular type of wood. The rule definition may include a first rule with a condition for identifying a first subset of data points arranged as a straight wood grain, and actions for adding artificial data points to extend the straight wood grain; a second rule with a condition for identifying a second subset of data points arranged as a spiral wood grain, and actions for adding artificial data points to extend the spiral wood grain; a third rule with a condition for identifying a third subset of data points arranged as a wavy wood grain, and actions for adding artificial data points to extend to extend the wavy wood grain. Accordingly, if a closest fiber is straight, system 200 may add artificial data points to extend that fiber further straight and increase the width of that fiber for a specified distance based on the first rule. However, if the closest fiber is slight curved, system 200 may add artificial data points to curve with the same radius and to narrow that fiber over a specified distance based on the second rule.

The material properties and associated rules may be used to generate realistic motion, animation, or effects in some embodiments. Specifically, forces (e.g., wind, gravity, push, pull, magnetism, etc.) and/or edits that produce change in the positional and/or non-positional elements of the data points may be applied differently depending on the material properties and rules associated with the material properties of the data points. The rules may define different reactions that different material properties have to different forces or changes.

Figure 7:
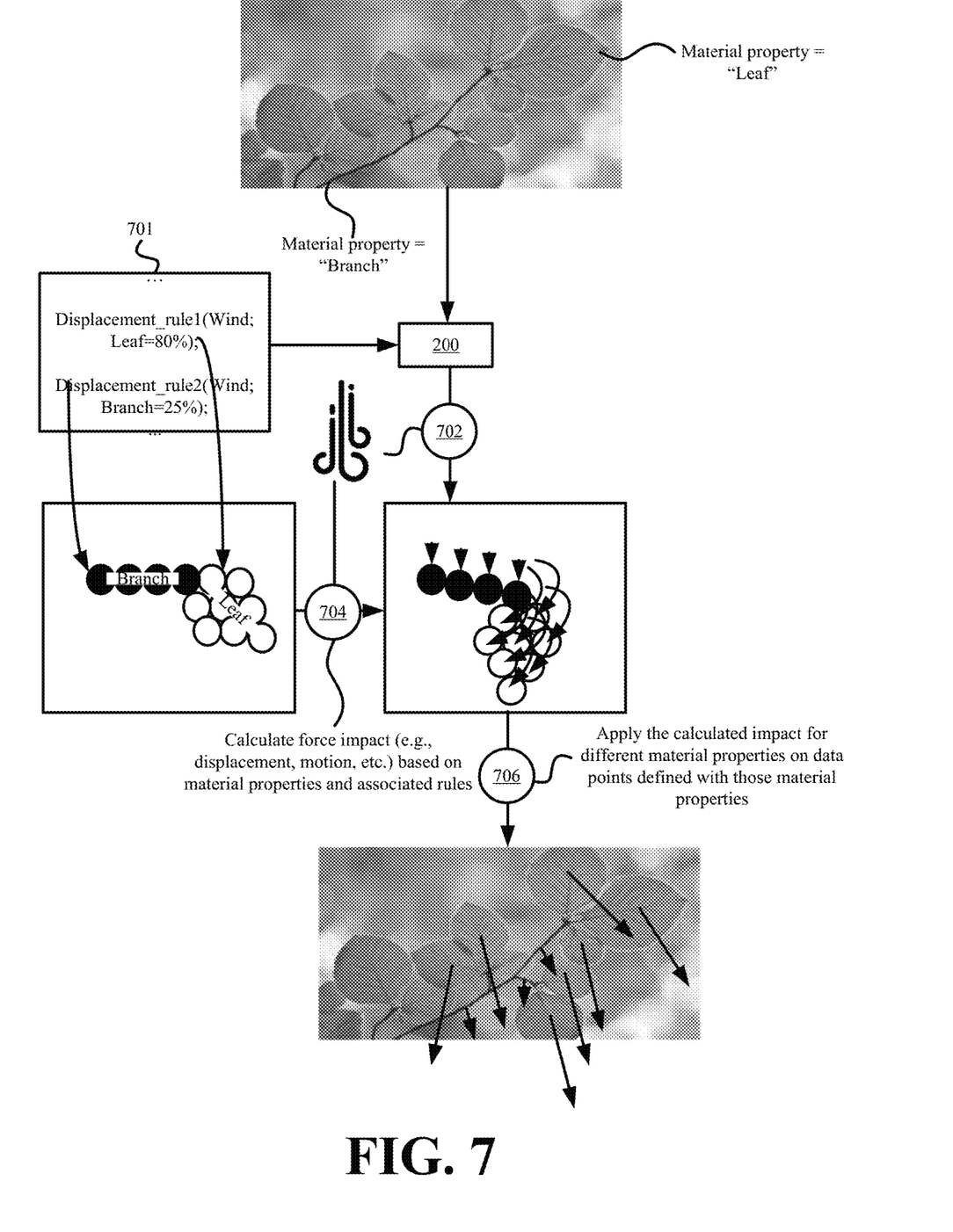
FIG. 7 illustrates an example of using the material properties and associated rules to control animation within a point cloud in accordance with some embodiments presented herein.

FIG. 7 illustrates an example of using the material properties and associated rules to control animation within a point cloud in accordance with some embodiments presented herein. The image illustrated in FIG. 7 may be generated from a first set of data points that are defined with the "leaf" material property, and a second set of data points that are defined with the "branch" material property.

Rule definition 701 may include one or more rules that define how data points with the "leaf" and "branch" material properties react differently to the same application of a force. For instance, a first rule may specify that the positional elements for data points with the "leaf" material property are displaced by an amount equal to 80% of an applied force, and a second rule may specify that the positional elements for data points with the "branch" material property are displaced by an amount equal to 25% of the applied force.

System 200 may introduce (at 702) a downward force, that may represent the blowing of wind, to the point cloud. System 200 may calculate (at 704) the different impact that the downward force has on the data points defined with the different material properties based on the different rules associated with the different material properties in rule definition 701, and may animate . As shown in FIG. 7, the force has a greater displacing impact on the data points with the "leaf" material property than on the data points with the "wood" material property. System 200 may apply (at 706) the calculated impact for each material property on the corresponding set of data points defined with those material properties.

FIG. 7 illustrates animation resulting from the application of a single force on the data points. However, in some embodiments, multiple forces may be simultaneously applied on the data points, and different rules may be defined for how data points associated with different material properties react to different forces. For instance, a first "kick" force and a second "wind" force may be applied to a first set of elastic data points and a second set of solid data points, with different rules associated with each material property and each force producing different amounts of displacement on each set of data points.

Figure 8:
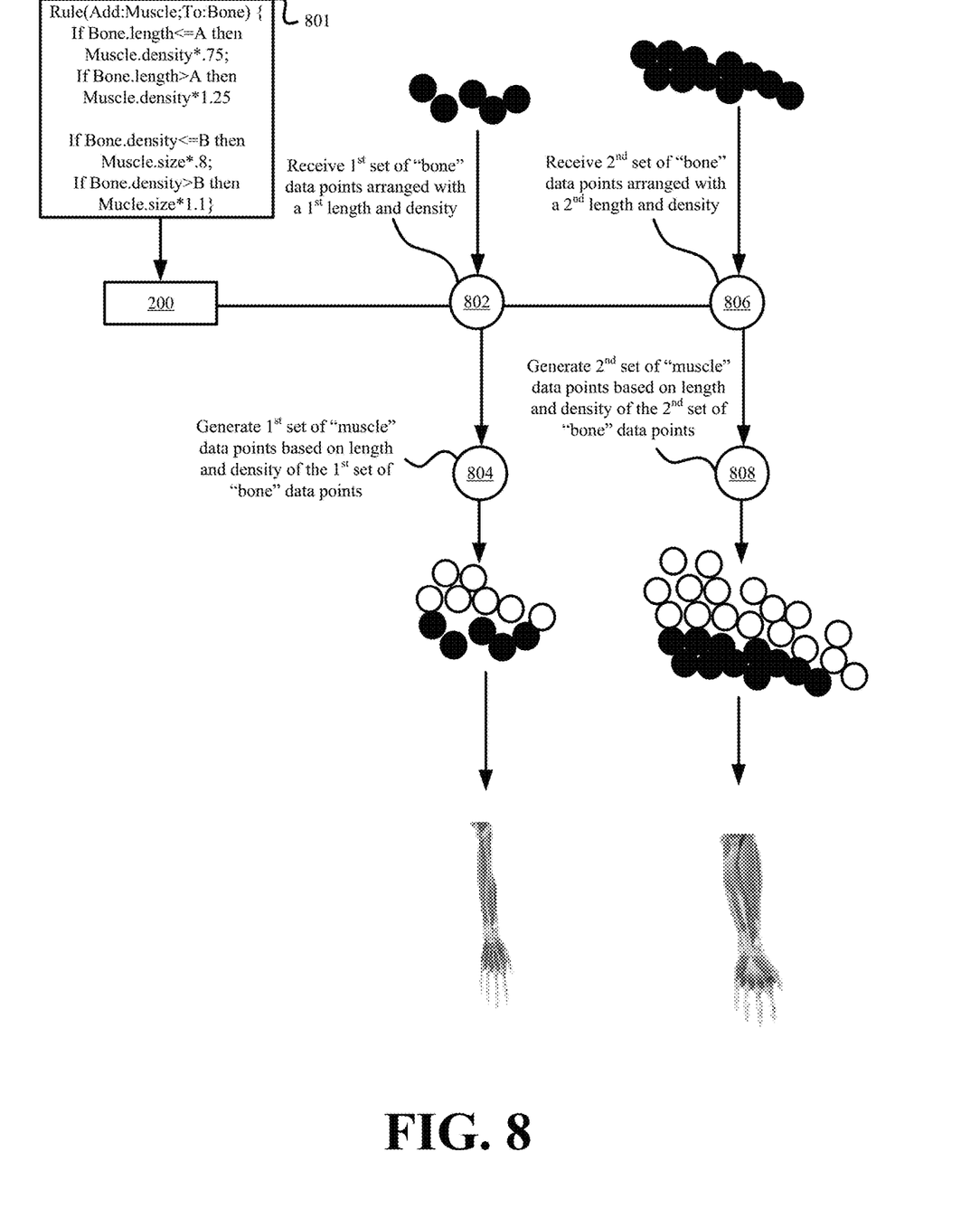
FIG. 8 illustrates an example of applying rules for dependent material properties in accordance with some embodiments presented herein.

In some embodiments, the rules within the rule definition for the same or different material properties may be interrelated or may include dependencies that alter the application of a rule. FIG. 8 illustrates an example of applying rules for dependent material properties in accordance with some embodiments presented herein.

As shown in FIG. 8, rule definition 801 may include a first rule for structuring data points that represent a "muscle" material property over data points that represent a "bone" material property. Specifically, the first rule conforms the structure of the muscle data points to one or more of the length, width, density, and/or size of the bone data points.

As shown in FIG. 8, system 200 may receive (at 802) a first point cloud with a first set of data points with the "bone" material property that are arranged with a first length and a first density. System 200 may artificially generate (at 804) a set of data points with the "muscle" material property over the first set of data points based on the structuring of the first set of data points. Specifically, system 200 may determine that the rule for the "muscle" material property is dependent on the structure of data points with the "bone" material property. Accordingly, system 200 may scan the first point cloud and analyze the positional elements of the first set of data points to determine the beginning and end data points for the represented bone, the distance between the beginning and end data points (e.g., the length), and/or the density of data points between the beginning and end data points. System 200 may adjust the structure of the set of "muscle" data points over the first set of data points based on the determined length and/or density of the first set of data points. Accordingly, system 200 may use the material properties and associated rules to adjust the length, size, and/or other structures of the set of "muscle" data points representing the muscle to conform to the length and size of the first set of data points representing the bone.

System 200 may receive (at 806) a second point cloud with a second set of data points with the "bone" material property that are arranged with a second length and a second density. Rather than artificially generate the same set of "muscle" data points over the second set of "bone" data points, system 200 may dynamically adapt the rules for generating the "muscle" data points based on the second length and second density of the second set of data points with the "bone" material property, and may generate (at 808) a larger and more dense set of "muscle" data points for the second set of "bone" data points than for the first set of "bone" data points.

Figure 9:
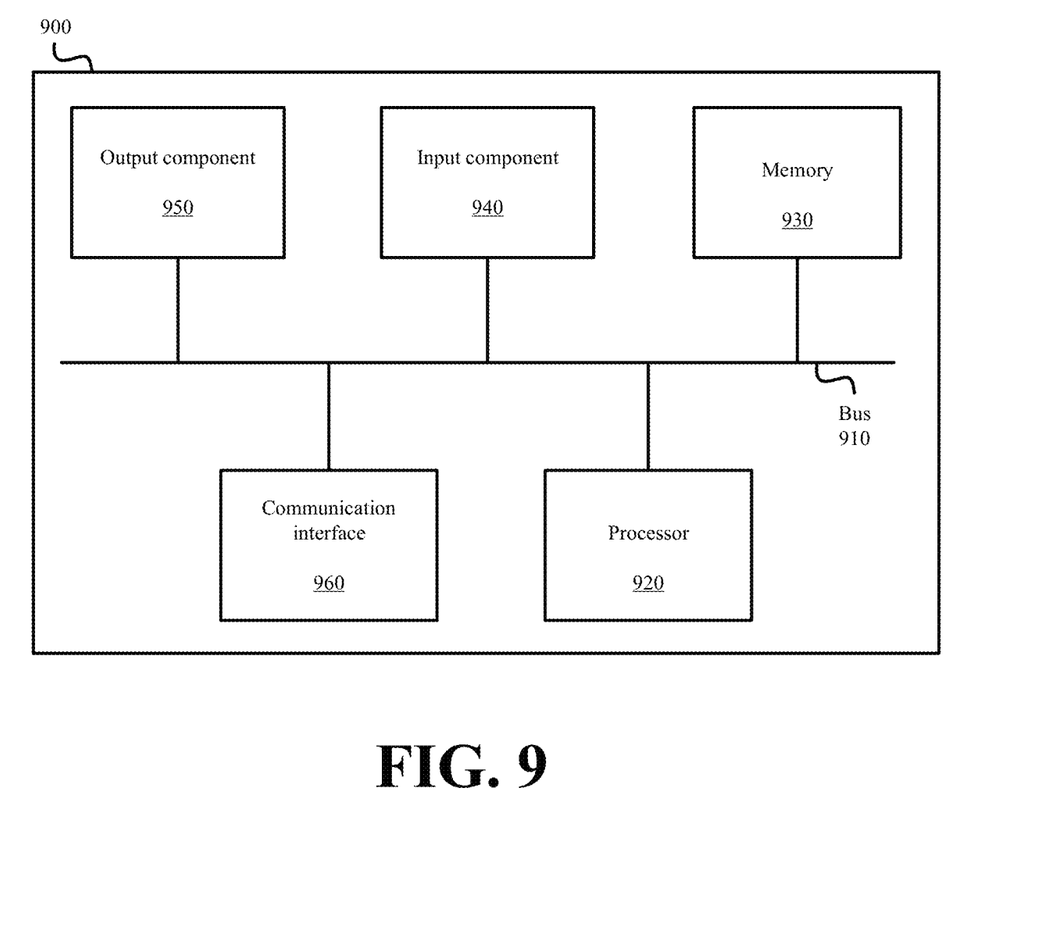
FIG. 9 illustrates example components of one or more devices, according to one or more embodiments described herein.

FIG. 9 is a diagram of example components of device 900. Device 900 may be used to implement one or more of the devices or systems described above (e.g., system 200, point cloud imaging devices, point cloud rendering devices, user devices, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    receiving an image comprising a first set of data points and a second set of data points, wherein each data point of the first set of data points and the second set of data points is defined with a set of elements and a material property identifier, wherein the set of elements define a position and visual characteristics of a data point, wherein the material property identifier of each data point of the first set of data points is associated with a first material property, wherein the material property identifier of each data point of the second set of data points is associated with a second material property that is different than the first material property, and wherein the first set of data points represent a first object with a first gap or omission, and the second set of data points represent a second object with a second gap or omission;
    retrieving a first rule definition that is defined for the first material property, and a second rule definition that is defined for the second material property, wherein the first rule definition and the second rule definition comprise one or more rules that are distinct from the set of elements of each data point;
    generating a third set of data points amongst the first set of data points based on a first rule of the first rule definition, wherein the first rule defines a first structural arrangement, and wherein generating the third set of data points amongst the first set of data points produces the first structural arrangement;
    generating a fourth set of data points amongst the second set of data points based on a second rule of the second rule definition, wherein the second rule defines a second structural arrangement, and wherein generating the fourth set of data points amongst the second set of data points produces the second structural arrangement;
    associating a tag to each data point of the third set of data points and the fourth set of data points, wherein the tag labels each data point of the third set of data points as being a newly generated data point having the first material property that is differentiable from the first set of data points having the first material property, and wherein the tag labels each data point of the fourth set of data points as being a newly generated data point having the second material property that is differentiable from the second set of data points having the second material property; and
    outputting an enhanced image of the first object formed from rendering the first set of data points and the third set of data points covering the first gap or omission, and of the second object formed from rendering the second set of data points and the fourth set of data points covering the second gap or omission.

2. The method of claim 1, wherein the first structural arrangement forms a different structure than the second structural arrangement.

3. The method of claim 1 further comprising:
    applying a common operation to the first set of data points and the second set of data points.

4. The method of claim 3, wherein applying the common operation comprises adding different details to the first set of data points than the second set of data points based on the first material property defined for the first set of data points and the second material property defined for the second set of data points.

5. The method of claim 1 further comprising:
    defining visual characteristics of the third set of data points differently than visual characteristics of the fourth set of data points based on different rules of the first rule definition being associated with the first material property and rules of the second rule definition being associated with the second material property.

6. The method of claim 1 further comprising:
    applying a common force to the first set of data points and the second set of data points;
    determining a first displacement rule from the first rule definition that is associated with the first material property, and a second displacement rule from the second rule definition that is associated with the second material property;
    displacing the first set of data points by a first amount derived from the common force and the first displacement rule; and
    displacing the second set of data points by a second amount derived from the common force and the second displacement rule.

7. The method of claim 6, wherein the first displacement rule specifies a first impact that the common force has on positional elements of the first set of data points, and wherein the second displacement rule specifies a different second impact that the common force has on positional elements of the second set of data points.

8. The method of claim 1 further comprising:
    determining that the set of elements of one or more data points of the first set of data points define positions that deviate from the first structural arrangement defined as the first rule of the first rule definition; and
    modifying the set of elements of the one or more data points to conform with the first structural arrangement.

9. The method of claim 1 further comprising:
    comparing a positioning of the first set of data points to the first structural arrangement;
    detecting the first gap or omission based on the positioning of the first set of data points deviating from the first structural arrangement at a particular position; and
    wherein generating the third set of data points comprises adding a new data point at the particular position.

10. The method of claim 1,
    wherein the first set of data points and the second set of data points correspond to a plurality of data points of a point cloud that are distributed in three-dimensional ("3D") space to represent a 3D environment, wherein the position of each data point is a particular position in the 3D space that corresponds to a position of a different surface, feature, or article of an object in the 3D environment, and wherein the visual characteristics of each data point are colors of the surface, feature, or article at the position in the 3D environment that corresponds to the particular position of the data point in the 3D space.

11. The method of claim 1,
wherein generating the third set of data points comprises adding a first number of data points according to the first rule in response to a particular input; and
wherein generating the fourth set of data points comprises adding a different second number of data points according to the second rule in response to the same particular input.

12. The method of claim 1 further comprising:
receiving a command to undo an edit applied to the first material property;
selecting the third set of data points in response to the command based on the third set of data points comprising the tag that labels each data point of the third set of data points as the newly generated data point having the first material property; and
removing the third set of data points from the enhanced image while retaining the first set of data points, the second set of data points, and the fourth set of data points.

13. A system comprising:
one or more processors configured to:
receive an image comprising a first set of data points and a second set of data points, wherein each data point of the first set of data points and the second set of data points is defined with a set of elements and a material property identifier, wherein the set of elements define a position and visual characteristics of a data point, wherein the material property identifier of each data point of the first set of data points is associated with a first material property, wherein the material property identifier of each data point of the second set of data points is associated with a second material property that is different than the first material property, and wherein the first set of data points represent a first object with a first gap or omission, and the second set of data points represent a second object with a second gap or omission;
retrieve a first rule definition that is defined for the first material property, and a second rule definition that is defined for the second material property, wherein the first rule definition and the second rule definition comprise one or more rules that are distinct from the set of elements of each data point;
generate a third set of data points amongst the first set of data points based on a first rule of the first rule definition, wherein the first rule defines a first structural arrangement, and wherein generating the third set of data points amongst the first set of data points produces the first structural arrangement;
generate a fourth set of data points amongst the second set of data points based on a second rule of the second rule definition, wherein the second rule defines a second structural arrangement, and wherein generating the fourth set of data points amongst the second set of data points produces the second structural arrangement;
associate a tag to each data point of the third set of data points and the fourth set of data points, wherein the tag labels each data point of the third set of data points as being a newly generated data point having the first material property that is differentiable from the first set of data points having the first material property, and wherein the tag labels each data point of the fourth set of data points as being a newly generated data point having the second material property that is differentiable from the second set of data points having the second material property; and
output an enhanced image of the first object formed from rendering the first set of data points and the third set of data points covering the first gap or omission, and of the second object formed from rendering the second set of data points and the fourth set of data points covering the second gap or omission.

14. The system of claim 13, wherein the first structural arrangement forms a different structure than the second structural arrangement.

15. The system of claim 13, wherein the one or more processors are further configured to:
apply a common operation to the first set of data points and the second set of data points.

16. The system of claim 13, wherein the one or more processors are further configured to:
define visual characteristics of the third set of data points differently than visual characteristics of the fourth set of data points based on different rules of the first rule definition being associated with the first material property and rules of the second rule definition being associated with the second material property.

17. The system of claim 13, wherein the one or more processors are further configured to:
apply a common force to the first set of data points and the second set of data points;
determine a first displacement rule from the first rule definition that is associated with the first material property, and a second displacement rule from the second rule definition that is associated with the second material property;
displace the first set of data points by a first amount derived from the common force and the first displacement rule; and
displace the second set of data points by a second amount derived from the common force and the second displacement rule.

18. A non-transitory computer-readable medium, storing a plurality of processor-executable instructions to:
receive an image comprising a first set of data points and a second set of data points, wherein each data point of the first set of data points and the second set of data points is defined with a set of elements and a material property identifier, wherein the set of elements define a position and visual characteristics of a data point, wherein the material property identifier of each data point of the first set of data points is associated with a first material property, wherein the material property identifier of each data point of the second set of data points is associated with a second material property that is different than the first material property, and wherein the first set of data points represent a first object with a first gap or omission, and the second set of data points represent a second object with a second gap or omission;
retrieve a first rule definition that is defined for the first material property, and a second rule definition that is defined for the second material property, wherein the first rule definition and the second rule definition comprise one or more rules that are distinct from the set of elements of each data point;

generate a third set of data points amongst the first set of data points based on a first rule of the first rule definition, wherein the first rule defines a first structural arrangement, and wherein generating the third set of data points amongst the first set of data points produces the first structural arrangement;

generate a fourth set of data points amongst the second set of data points based on a second rule of the second rule definition, wherein the second rule defines a second structural arrangement, and wherein generating the fourth set of data points amongst the second set of data points produces the second structural arrangement;

associate a tag to each data point of the third set of data points and the fourth set of data points, wherein the tag labels each data point of the third set of data points as being a newly generated data point having the first material property that is differentiable from the first set of data points having the first material property, and wherein the tag labels each data point of the fourth set of data points as being a newly generated data point having the second material property that is differentiable from the second set of data points having the second material property; and output an enhanced image of the first object formed from rendering the first set of data points and the third set of data points covering the first gap or omission, and of the second object formed from rendering the second set of data points and the fourth set of data points covering the second gap or omission.

\* \* \* \* \*